(12) United States Patent
Mao et al.

(10) Patent No.: US 10,409,333 B2
(45) Date of Patent: Sep. 10, 2019

(54) REPLACEABLE KEYPAD BEZEL

(75) Inventors: Yanmin Mao, Mississauga (CA); Jin Liu, Mississauga (CA)

(73) Assignee: Psion Inc., Mississauga, Ontario (CA)

( * ) Notice: Subject to any disclaimer, the term of this patent is extended or adjusted under 35 U.S.C. 154(b) by 0 days.

(21) Appl. No.: 13/091,553

(22) Filed: Apr. 21, 2011

(65) Prior Publication Data

US 2012/0061118 A1 Mar. 15, 2012

Related U.S. Application Data

(60) Provisional application No. 61/327,163, filed on Apr. 23, 2010.

(51) Int. Cl.
*G06F 1/16* (2006.01)
*H04M 1/23* (2006.01)

(52) U.S. Cl.
CPC .......... *G06F 1/1662* (2013.01); *H04M 1/23* (2013.01); *Y10T 29/49002* (2015.01); *Y10T 29/53274* (2015.01)

(58) Field of Classification Search
CPC ....... G06F 1/1662; G06F 1/1669; H04M 1/23
USPC .......................................................... 174/66
See application file for complete search history.

(56) References Cited

U.S. PATENT DOCUMENTS

| | | | | |
|---|---|---|---|---|
| 5,657,052 A * | 8/1997 | Lerude | ................ | G06F 1/1626 341/22 |
| 5,679,943 A * | 10/1997 | Schultz | ................ | G06F 1/1626 235/472.02 |
| 5,848,152 A * | 12/1998 | Slipy | ................ | H04M 1/0216 379/433.13 |
| 5,960,078 A * | 9/1999 | Eckhardt | ................ | H04M 1/0283 379/433.01 |
| 6,109,528 A * | 8/2000 | Kunert | ................ | G06K 7/10881 235/462.45 |
| 6,731,913 B2 * | 5/2004 | Humphreys | ........ | H04B 1/3888 361/600 |
| 7,149,558 B2 * | 12/2006 | Kakuguchi | ........ | H04B 1/3883 455/575.8 |
| 7,172,114 B2 * | 2/2007 | Fletcher | ................ | G06F 1/1609 235/379 |
| 8,723,804 B2 * | 5/2014 | Fletcher | ................ | G07G 1/0018 178/18.01 |
| 2001/0017255 A1 * | 8/2001 | Katsumi | ................ | B26B 19/38 200/302.2 |
| 2007/0033972 A1 * | 2/2007 | Wang | ................ | H04M 1/026 70/358 |
| 2010/0025286 A1 * | 2/2010 | Mangaroo | ............ | G06F 1/1626 206/701 |
| 2010/0226084 A1 * | 9/2010 | Chen | ................ | G06F 1/1626 361/679.08 |

* cited by examiner

*Primary Examiner* — Binh B Tran
*Assistant Examiner* — Douglas R Burtner

(57) ABSTRACT

A keypad bezel for attaching to a housing of a handheld computer comprises a main body including plurality of screw holes and tabs for connecting the main body to the computer housing and a plurality of leverage points in the main body useful for removing the keypad bezel from the housing. To remove the keypad bezel, the screws are removed from the screw holes and a removal tool is positioned so that it mates with recesses the keypad bezel and force is applied to the removal tool in a direction way from the housing. The force removes the tabs out of corresponding slots in the housing, allowing the bezel to be removed.

6 Claims, 5 Drawing Sheets

REPLACEABLE KEYPAD BEZEL

RELATED APPLICATIONS

This application claims the benefit of priority from U.S. provisional patent application Ser. No. 61/327,163, filed Apr. 23, 2010 and entitled "Replaceable Keyboard Bezel" and the contents of this priority application is incorporated herein, in its entirety, by reference.

FIELD OF THE INVENTION

The present invention relates generally to a keypad assembly. More specifically, the present invention relates to a keypad assembly which includes a keypad bezel that can be easily removed and/or replaced.

BACKGROUND

Given the proliferation of handheld mobile computing devices, it is desirable to make them modular. Modularity leads to efficiencies in the manufacturing and warehousing of the computing devices and their parts. Further, modularity allows parts of the computing device to be replaced by a customer. In order to improve longevity of the device and the reusability of the parts, it is desirable to make the parts easy to remove. If the parts are easy to remove, damage to both the housing of the computing device and the part itself can be limited.

SUMMARY

It is an object of the present invention to provide a novel keypad bezel, removal tool for a keypad bezel and a method for removing a keypad bezel at least one of which obviates or mitigates an issue with the prior art.

In accordance with an aspect of the present invention, there is provided a keypad bezel for attaching to a housing of a handheld computer, the bezel comprising: a main body including a plurality of screw holes and tabs for connecting to the main body to the housing; and a plurality of leverage points in the main body useful for removing the keypad bezel from the housing.

In accordance with a further aspect of the present invention, there is provided a removal tool configured to remove a keypad bezel from a housing of a handheld computer, the keypad bezel comprising a plurality of recesses, the removal tool comprising: a body portion; and a head portion connected to the body portion, the head portion comprising a plurality of spaced apart protrusions each configured to mate with a corresponding one of the recesses of the keypad bezel.

In accordance with yet a further aspect of the present invention, there is provided a method for removing a keypad bezel from a housing of a handheld computer using a removal tool, the keypad bezel comprising a plurality of recesses land the removal tool comprising a plurality of protrusions configured to mate with the recesses of the keypad bezel, the method comprising the steps of: mating the removal tool with the keypad bezel, thereby engaging a leverage point on the keypad bezel; and applying force in a direction away from the housing to remove the keypad bezel thereby inhibiting damage to both the keypad bezel and the housing.

BRIEF DESCRIPTION OF THE DRAWINGS

Embodiments of the invention grill now be described by way, of example only with reference to the following drawings in which.

DETAILED DESCRIPTION OF THE PREFERRED EMBODIMENTS

Figure 1:
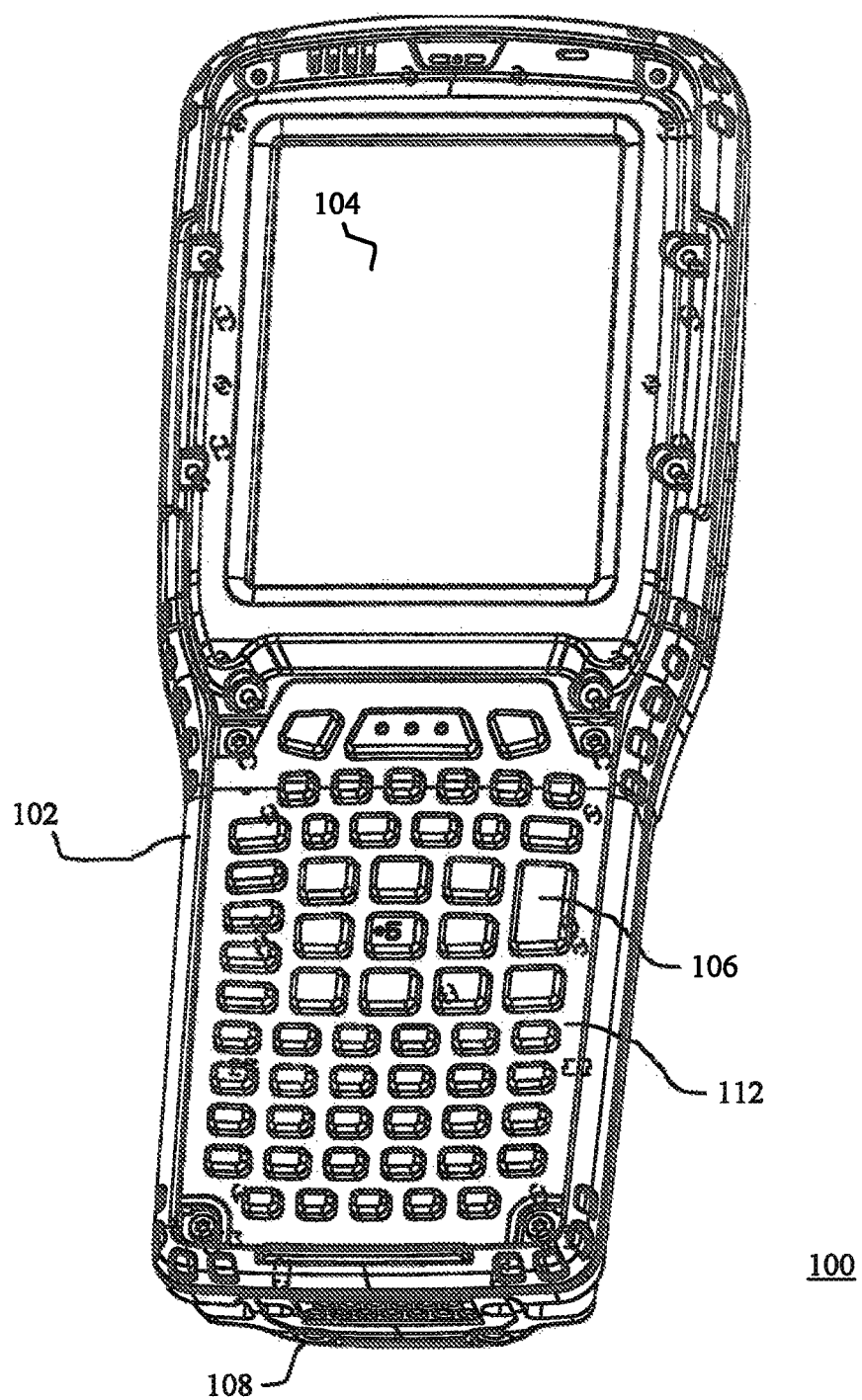
FIG. 1 is a perspective view of the front, bottom and side of a mobile computer.

For convenience, like numerals in the description refer to like structures in the drawings. Referring to FIG. 1 a handheld computer (herein referred to variously and interchangeably as a handheld device a mobile computer, or a mobile device) is shown generally by numeral 100.

The handheld computer 100 comprises a housing 102, a display 104, a keypad 106, a keypad bezel 112 and a battery compartment 108 for storing a rechargeable battery (not shown). Additionally in the present embodiment, the mobile computer 100 has the capability of wireless communicating data and/or voice, to and from servers as well as data acquisition sources within a communication network. One or more circuit board are housed within the mobile computer 100 for providing the electronic components required to implement at least a portion of the functionality provided by the mobile computer 100.

Figure 2:
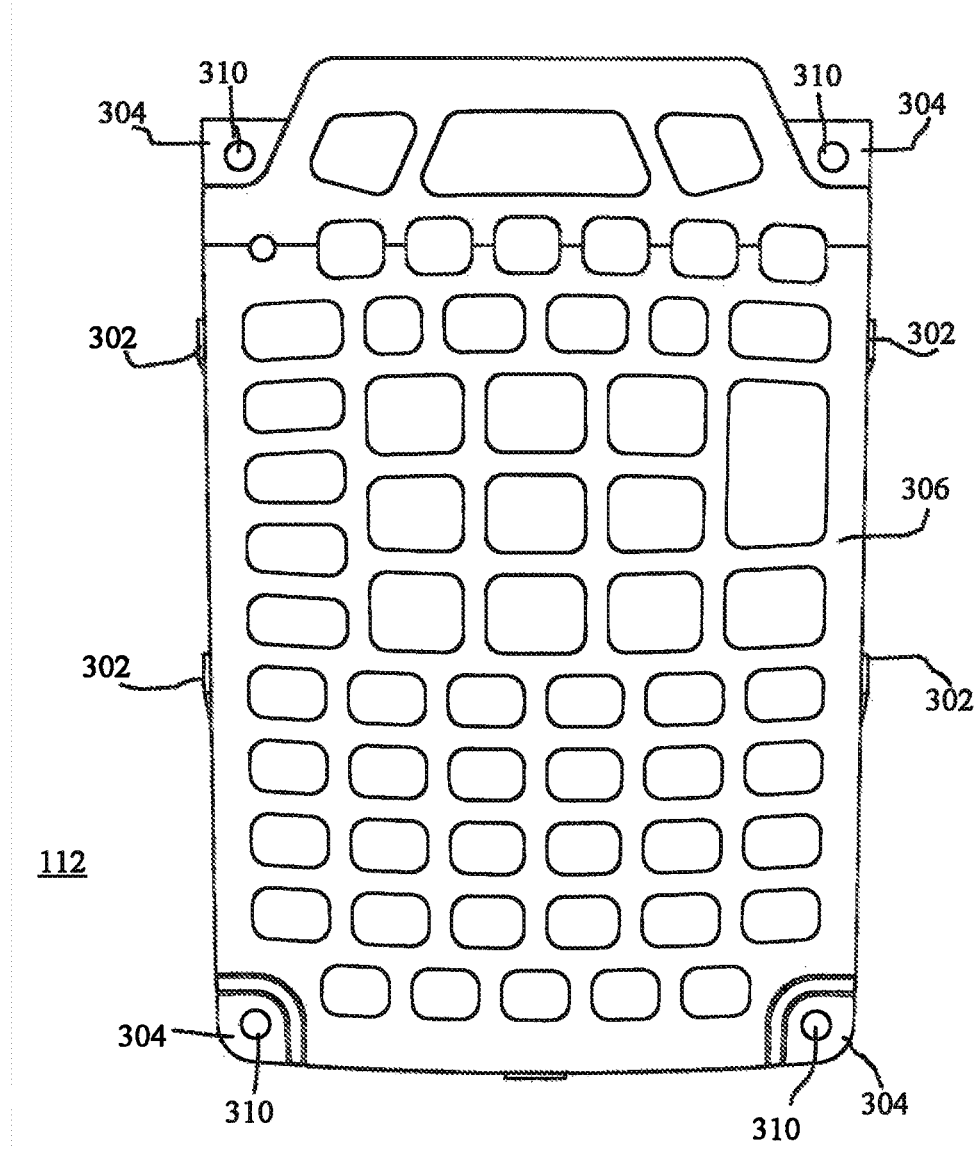
FIG. 2 is a front view of a keypad bezel for use with the mobile computer of FIG. 1.

Referring to FIG. 2, a front view of the keypad bezel is shown in greater detail. In order to maximize space on the keypad 106, only four screw-holes 310 are provided in the keypad bezel 112. However, with this limited number of screw-holes 310, not enough force can be maintained on the keypad bezel 112 to create a necessary seal to limit of water, dust and the like. Accordingly, tabs 302 are provided along the length of the keypad bezel 112. Additional tabs may be provided along the with of the keypad bezel. The tabs are configured to be received by corresponding slots (not shown) in the housing 102, thereby providing enough pressure to maintain the necessary seal. However, such an implementation makes it difficult to remove the keypad bezel, especially without damaging the keypad bezel 112 or the housing 102. In the present embodiment, the keypad bezel 112 includes four corner portions 304 and a main body 306. A pair of tabs 302 is provided along each side of the keypad bezel 112. The tabs 302 in each pair are spaced apart to increase the pressure imparted by the keypad bezel on the keypad 106 while in place. A single tab is provided along each of a top side and a bottom side of the keypad bezel 112. It will be appreciated by a person of ordinary skill in the art that the number of tabs 302, as well as the location thereof, may vary for different implementations.

Figure 3A:
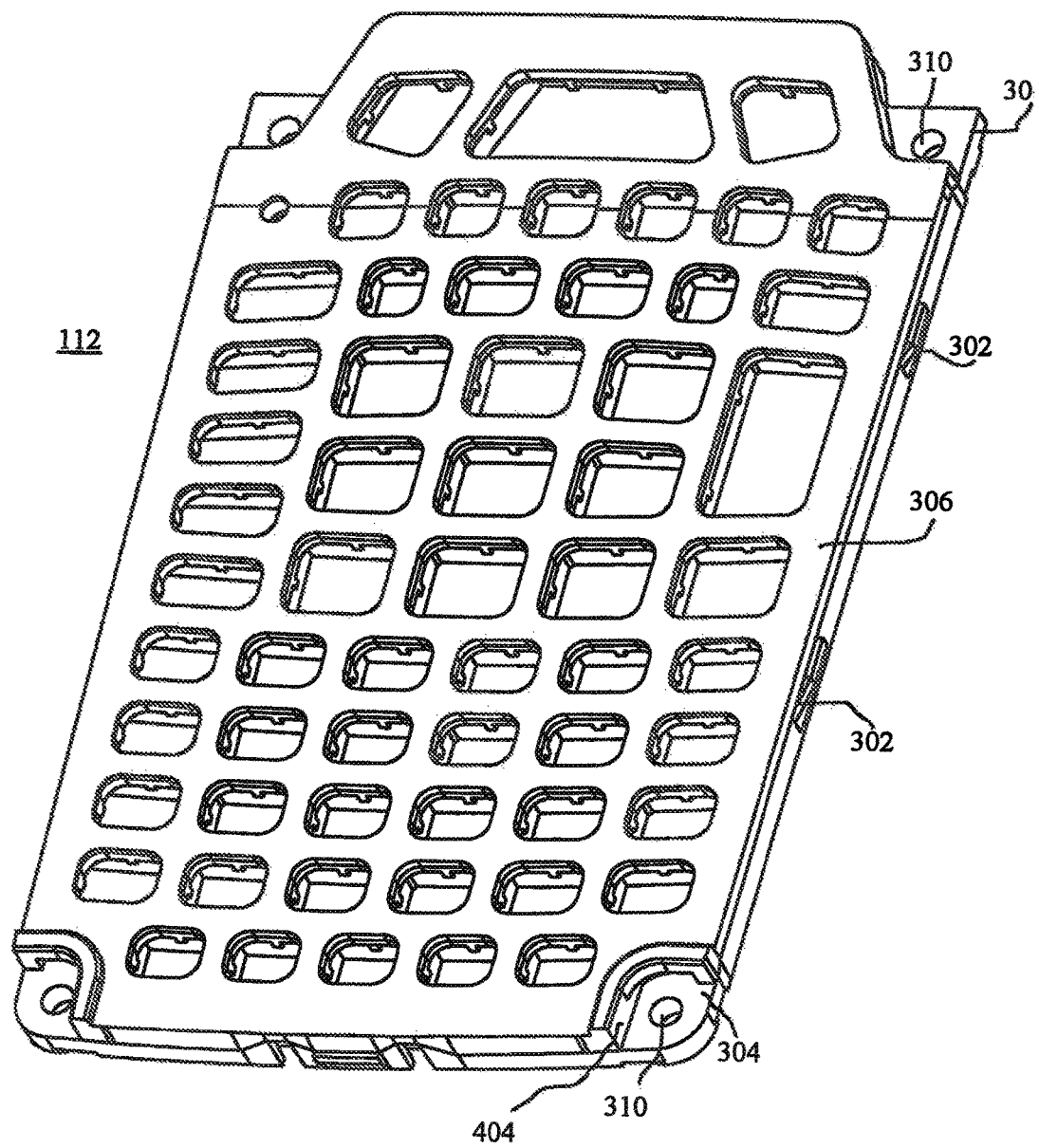
FIG. 3a is front perspective view of the keypad bezel of FIG. 2.
Figure 3B:
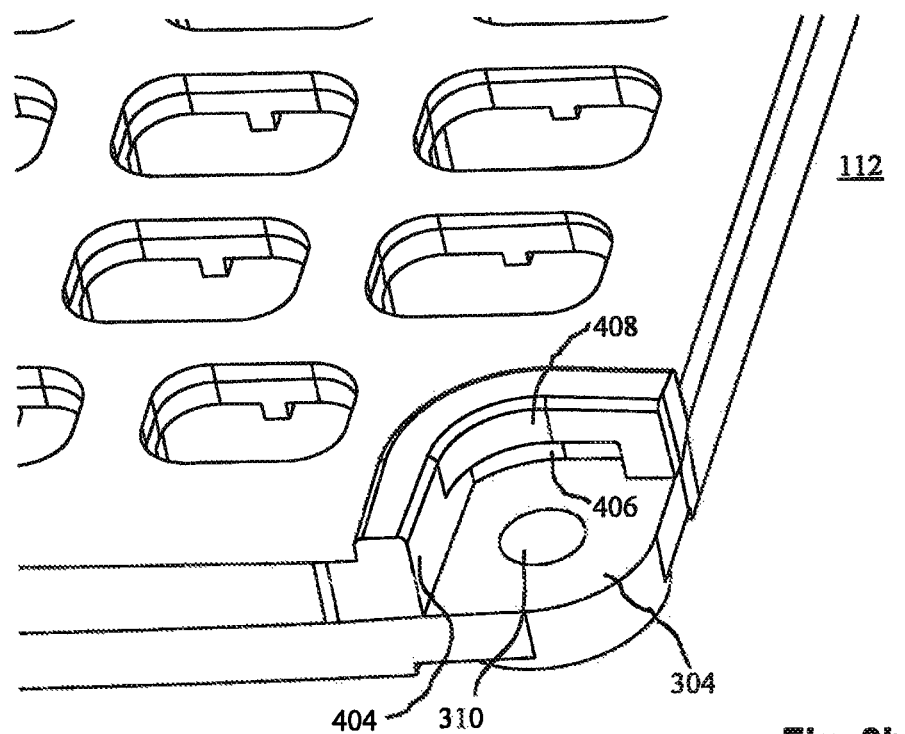
FIG. 3b is an enlarged perspective view of a portion of the keypad bezel of FIG. 2.

Referring to FIG. 3a, a front perspective view of the keypad bezel 112 is shown. In order to improve the ease with which the keypad bezel 112 can be removed, leverage points are provided to assist removal of the keypad bezel 112. Referring to FIG. 3b, an enhanced view of a corner portion 304 of the keypad bezel 112 is shown. As illustrated in FIGS. 1, 3a and 3b, each of the screw-holes 310 is located on a corresponding corner portion 304 of the keypad bezel 112. Each of the corner portions 304 is set in a plane that is in substantially the same direction as the main body 306. As will be appreciated, the corner portions 304 and the main body 306 may not be exactly parallel because of the curvature of the surfaces involved as well as the space requirements. In the present embodiment, this results in the corner portions 304 being vertically displaced from the main body 306 so that the corner portions 304 are lower than the main body 306 when the keypad bezel 112 is seated in the housing 102.

The vertical spaces between the main body 306 and the corner portions 304 are sealed by side walls 404. In the present embodiment, the side walls 404 of the bottom two corner portions include a recess 406 creating a lip 408. The recess 406 is created along a horizontal portion of the side wall 404. The recess 406 begins at, or proximal to, a vertical portion of the side wall 404 and ends proximal to an outer edge of the side wall 404. Accordingly, the lip 408 can act as the leverage points to assist removal of the keypad bezel 112.

Although the present embodiment is described as having recesses 406 in the bottom two corner portions of the keypad bezel, recesses 406 may, alternatively, be provided in the top two corner portions of the keypad bezel 112. Yet alternatively, recesses 406 may be provided in all four corner portions of the keypad bezel 112.

Figure 4:
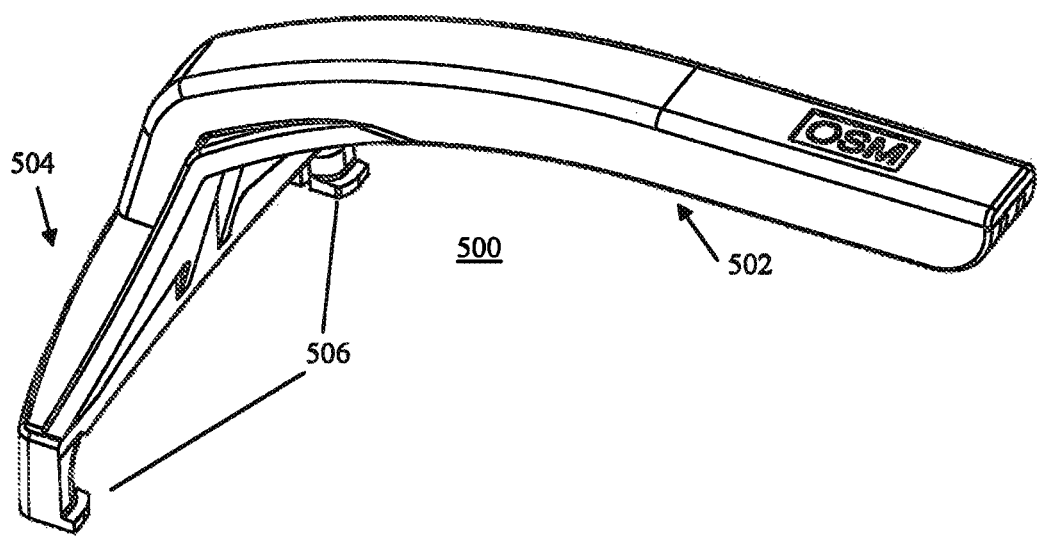
FIG. 4 is a perspective view of the top and side of a removal tool for use with the bezel of FIG. 2.
Figure 5:
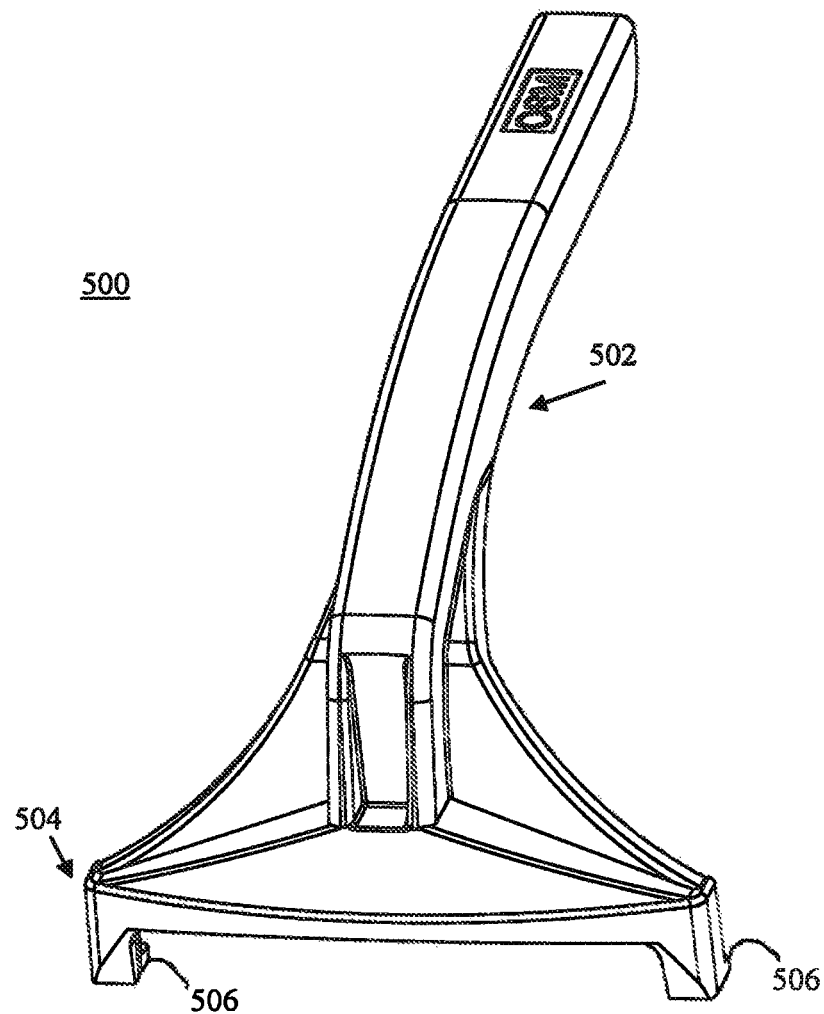
FIG. 5 is a front perspective view of the removal tool of FIG. 4.

Referring to FIGS. 4 and 5, a removal tool is illustrated generally by numeral 500. The removal tool includes a body portion 502 and a head portion 504. In the present embodiment, the body portion 502 is a handle. The head portion 504 includes a pair of spaced apart protrusions 506. The protrusions 506 are shaped to be able to mate with the recess 406 in the side walls 404 of the keypad bezel 112. Further, the protrusions are spaced apart the same distance that the recesses 406 are spaced apart.

In operation the keypad bezel 112 is attached to the housing 102 of the handheld computer 100 as follows. The keypad bezel 112 is initially snapped into place so that the tabs 302 engage the corresponding slots in the housing 102. The keypad bezel 112 is further secured to the housing 102 by inserting screws through screw-holes 310. The screws are received by threaded bore (not shown) in the housing 102.

The keypad bezel 112 is removed from the housing 102 of the handheld computer 100 as follows. The screws are removed from the screw-holes 310. In the present embodiment the recesses 406 are not accessible to the removal tool 500 until the screws have been removed. This limits damage to the keypad bezel 112 that may occur if an attempt to remove it is made while it is still screwed to the housing 102. The removal tool 500 is positioned so that the 506 mate with the recesses 406 in protrusions the keypad bezel 112. Force is applied on the removal tool 500 in a direction away from the housing 102. The force snaps the tabs 302 out of the corresponding slots in the housing 102. In the present embodiment, the tab 302 along the bottom edge of the keypad bezel 112 is snapped out of the housing before the tabs 302 along the sides. At this point the tab 302 at the top is easily removed from the housing 102. Because the lip 408 provides a designed leverage point little damage is inflicted upon the keypad bezel 112 upon its removal. Further, since the housing 102 does not have to be used as a leverage point, little damage is inflicted on the housing 102 upon removal of the keypad bezel 112. Therefore, longevity of the keypad bezel 112 and the housing 102 may be improved.

Although the invention is described with reference to specific embodiment, modifications to the embodiment will become apparent to a person of ordinary skill in the art.

For example, in an alternative embodiments the recess 406 is created along a vertical portion of the side wall 404. The recess 406 begins at or proximal to the horizontal portion of the side wall 404 and ends proximal to an outer edge of the side wall 404. In this embodiment, the recesses 406 would be provided in either the two left corner portions, the two right corner portions, or in all four corner portions. It will be appreciated that the protrusions 506 of the removal tool 500 will be further spaced apart in the present embodiment than in the previous embodiments.

In yet an alternate embodiment, the body portion 502 of the removal tool 500 can also contain a frame or other assembly that provides an external pivot point for the handle.

In yet an alternate embodiment, a spring loaded faceplate (not shown) can be provided in the recess 406. The spring loaded faceplate is biased so that the faceplate is flush with the side wall 404. The faceplate is sized to conceal the recess 406. When the removal tool 500 engages the faceplate, it moves into the recess 406 revealing the lip 408. The present embodiment functions in a similar fashion to the previous embodiments. However, it is expected that the faceplate may inhibit dirt from becoming trapped in the recess 406 or at least reduce the amount of dirt that may get trapped.

In yet an alternate embodiment, only two of the four corners portions 304 may be vertically displaced from the main body 306 of the keypad bezel 112.

In yet an alternate embodiment the leverage point are not provided by the recesses 406 described above. Rather, other features, whether connected to the side wall 404 or not, may protrude or recess from the main body 306 of the keypad bezel 112 to create the access lips or the keypad bezel 112 removal.

In yet an alternate embodiment, the screw-holes 310 are not positioned close the corners of the keypad bezel 112, as described above, but further along the sides of the keypad bezel 112.

Therefore, although the invention has been described with reference to certain specific embodiments, various modifications or combination thereof will be apparent to those skilled in the art without departing from the scope of the invention as defined by the appended claims.

What is claimed is:

1. A keypad bezel for attaching to a housing of a handheld computer, the bezel comprising:
    a main body including a plurality of screw holes and tabs for connecting the main body to the housing;
    a plurality of corner portions, each corner portion comprising one of the screw holes and being set in a plane substantially parallel to the main body;
    a plurality of side walls connecting the plurality of corner portions with the main body; and
    a recess in each of the side walls creating a lip that protrudes above the recess, the lip disposed below a plane of the main body,
    wherein:
        the lip partially covers the recess to provide a leverage point shaped for removing the keypad bezel from the housing, and
        the recess in each of the side walls is configured to mate with a corresponding one of a plurality of protrusions of a removal tool, wherein the recess is created along a horizontal portion of the side wall and begins proximal to a vertical portion of the side wall and ends proximal to an outer edge of the side wall.

2. The keypad bezel of claim 1, wherein four corner portions are set in a plane in the same general direction as the main body.

3. The keypad bezel of claim 2 wherein the main body is configured to be higher than the plane in which the four corner portions are set, when placed in the housing.

4. The keypad bezel of claim 1, wherein each recess further comprises a spring-loaded faceplate biased to be flush with the side wall and moveable to reveal the recess.

5. The keypad bezel of claim 3, wherein the spring-loaded faceplate is sized to conceal the recess.

6. The keypad bezel of claim 1, wherein the tabs are located along at least one of a length or a width of the keypad bezel.

\* \* \* \* \*